UNITED STATES PATENT OFFICE.

LOUIS JOSEPH DUROUX, OF PARIS, FRANCE.

IMPROVEMENT IN PURIFYING SPIRITS OF TURPENTINE.

Specification forming part of Letters Patent No. 180,467, dated August 1, 1876; application filed May 31, 1876.

*To all whom it may concern:*

Be it known that I, LOUIS JOSEPH DUROUX, of 49 Rue de la Chaussée d'Antin, Paris, France, have invented certain new and useful Improvements in Purifying Spirits of Turpentine; and I declare that the following is a full and exact description thereof.

This improvement has reference to purifying spirits of turpentine; and consists in the use of alum, either pure or contained in water, which I mix with the spirits of turpentine to be purified by agitation or otherwise. After having allowed this mixture to settle it is found to be divided in two separate layers when pure alum is employed, the lower one consisting in the alum combined with the impurities it has extracted from the spirits of turpentine, and the upper one consisting in the purified spirits of turpentine; and when I make use of alum-water the mixture is divided in three layers—viz., the lower one consisting in the alum-water, the middle in the impurities, and the upper one in the purified spirits of turpentine. These I then separate, either by withdrawing the upper layer of purified spirits or the lower layer of impurities in the first case, or the central layer of impurities and the lower layer of alum-water in the second case. This method of purification can be carried out either cold or hot, as well during as after the process of manufacturing the spirits of turpentine.

According to the first method I proceed as follows: I take any quantity of ordinary commercial spirits of turpentine—say, one hundred gallons—to which I add from two to three per cent., by weight, of powdered alum. I agitate this mixture during one or two minutes, and very shortly afterward the alum, with the impurities, settles down on the bottom of the vessel employed for the purpose. This operation can be repeated several times. I afterward allow the whole to settle for one or two days or more, and then separate the purified parts from the alum containing the impurities, or the latter from the former, in the manner above stated.

According to the second method, I dissolve in fifty gallons of water from five to ten per cent., by weight, of alum, (the water may be slightly heated to assist the solution,) and mix this alum-water with fifty gallons of spirits of turpentine. I agitate this mixture, allow it to settle, and withdraw the purified spirits, as stated with respect to my first process.

Spirits of turpentine prepared in this manner are much purer than those in ordinary use. Their quality is easily ascertained by mixing therewith eighty or ninety per cent., by weight, of dammara rosin, produced by the *Agathis lorantifolia*, slightly agitating the same until the rosin is dissolved. The aluminous spirit thus produced is exceedingly limpid and transparent, while that in ordinary use is more or less milky or turbid.

Having thus explained the nature of my invention, as well as the best means that I am acquainted with for putting it into practice, I claim—

The described process of purifying spirits of turpentine, the same consisting in mixing the same with powdered alum, or with alum-water, in the proportions substantially as stated, and either in a hot or cold state, then agitating the same, and allowing the mixture to settle, and drawing off or separating the purified spirits, all substantially as set forth.

DUROUX.

Witnesses:
 AUTIN,
 BOUSSARD.